United States Patent
Nishibori

(10) Patent No.: US 8,159,507 B2
(45) Date of Patent: Apr. 17, 2012

(54) DISPLAY DEVICE, DISPLAY METHOD, INFORMATION RECORDING MEDIUM AND PROGRAM

(75) Inventor: Takashi Nishibori, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 443 days.

(21) Appl. No.: 12/445,183

(22) PCT Filed: Oct. 12, 2007

(86) PCT No.: PCT/JP2007/069964

§ 371 (c)(1),
(2), (4) Date: Apr. 10, 2009

(87) PCT Pub. No.: WO2008/044768

PCT Pub. Date: Apr. 17, 2008

(65) Prior Publication Data

US 2010/0118055 A1    May 13, 2010

(30) Foreign Application Priority Data

Oct. 13, 2006  (JP) .................................. 2006-279615

(51) Int. Cl.
*G09G 5/00* (2006.01)
(52) U.S. Cl. ......... 345/660; 345/667; 345/670; 345/671
(58) Field of Classification Search .................. 345/660, 345/667, 670, 671
See application file for complete search history.

(56) References Cited

U.S. PATENT DOCUMENTS

| 5,686,940 | A  | * | 11/1997 | Kuga ............................ 345/156 |
| 6,971,072 | B1 | * | 11/2005 | Stein ............................. 715/866 |
| 7,177,488 | B2 | * | 2/2007  | Berkner et al. ................ 382/298 |

(Continued)

FOREIGN PATENT DOCUMENTS

EP    1443763 A2    4/2004

(Continued)

OTHER PUBLICATIONS

European Supplementary Search Report and Written Opinion dated Oct. 28, 2009 for Application No. EP07829700, 8 pages.

(Continued)

*Primary Examiner* — M Good Johnson
(74) *Attorney, Agent, or Firm* — Howard & Howard Attorneys PLLC

(57) ABSTRACT

In a display device (301), in order to improve the visibility by changing a size for displaying character or patterns on a display screen in accordance with a distance from a user viewing the display screen, a text-containing image generating unit (305) generates a character image indicative of a character train to be presented to a user, a graphic image generating unit (306) generates a pattern image indicative of patterns to be presented to a user, a measuring unit (303) measures a distance between a display screen on which a displaying unit (302) displays the image and the user, a enlargement/contraction ratio acquiring unit (304) acquires a pattern enlarging and reducing rate that increases as the measured distance becomes large and a character enlarging and reducing rate that gently changes at a rate that is less than the pattern enlarging and reducing rate, and a control unit (307) gives the pattern image, the pattern enlarging and reducing rate, the character image and the character enlarging and reducing rate to a displaying unit (302) and makes it display them.

5 Claims, 6 Drawing Sheets

U.S. PATENT DOCUMENTS

| | | | |
|---|---|---|---|
| 7,969,413 B2 * | 6/2011 | Aonuma et al. | 345/156 |
| 2002/0175924 A1 | 11/2002 | Yui et al. | |
| 2003/0234799 A1 | 12/2003 | Lee | |
| 2004/0230904 A1 | 11/2004 | Tada | |
| 2005/0030322 A1 | 2/2005 | Gardos | |
| 2005/0229200 A1 * | 10/2005 | Kirkland et al. | 725/12 |
| 2006/0252541 A1 * | 11/2006 | Zalewski et al. | 463/36 |

FOREIGN PATENT DOCUMENTS

| | | |
|---|---|---|
| JP | 62-272668 | 11/1987 |
| JP | 04-100386 | 4/1992 |
| JP | 09-054374 | 2/1997 |
| JP | 10-260666 | 9/1998 |
| JP | 11-238124 | 8/1999 |
| JP | 2003-140632 | 5/2003 |

OTHER PUBLICATIONS

International Search Report PCT/JP2007/069964 dated Nov. 13, 2007.

* cited by examiner

FIG. 2
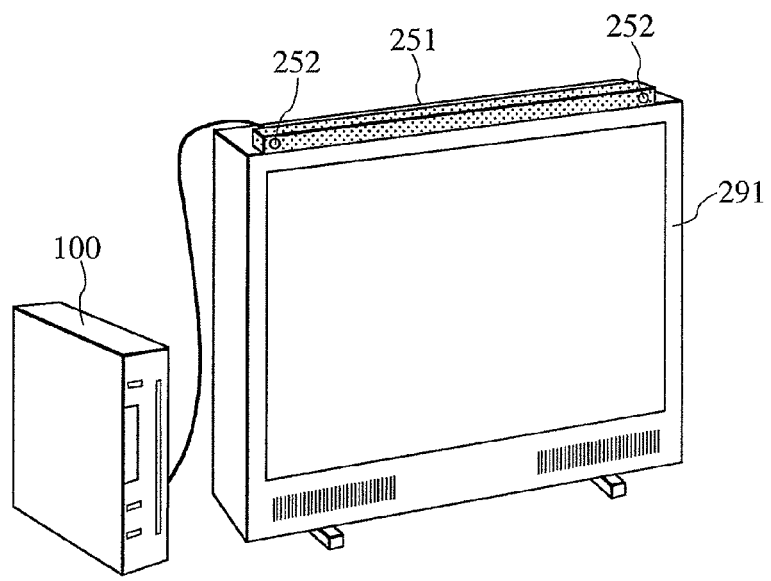
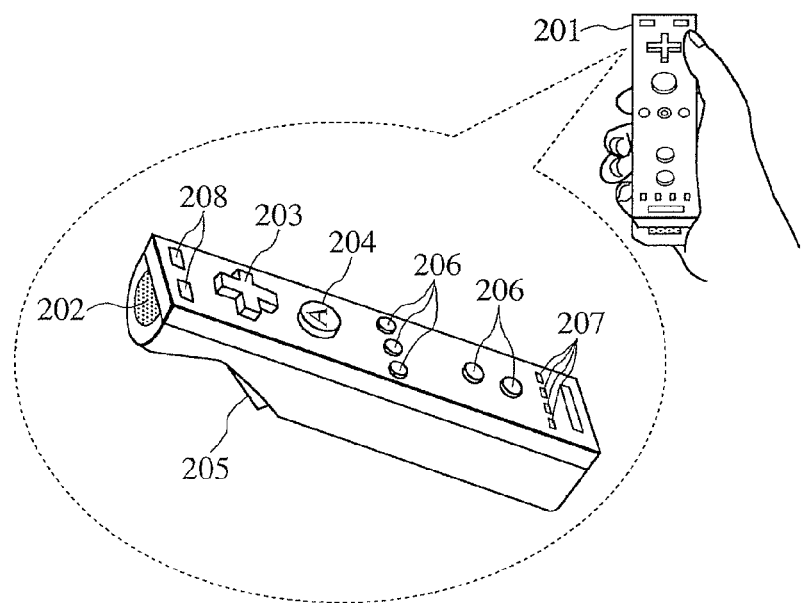

DISPLAY DEVICE, DISPLAY METHOD, INFORMATION RECORDING MEDIUM AND PROGRAM

TECHNICAL FIELD

The present invention relates to a display device and a display method that are preferable for changing the size of text and graphics to be displayed on the screen according to the distance between the display screen and the user looking thereat as well as for enhancing the viewability thereof. Also, the present invention relates to a program for implementing the above device and method on a computer as well as a computer-readable information recording medium recording the program.

BACKGROUND ART

Conventionally, there have been widely known techniques to adjust the positional relationship between a projector and a screen or between or among lenses so as to change the size and shape of a display area projected onto the screen.

Such techniques are disclosed in, e.g., the following literature:

Patent Literature 1: Unexamined Japanese Patent Application KOKAI Publication No. H9-54374.

Due to restrictions on the positional relationship between a projector and a screen and the orientations thereof, the shape of a display area projected onto the screen eventually becomes trapezoidal. Patent Literature 1 proposes a technique to correct trapezoidal distortions on a liquid crystal projector using a prism.

Adjustment of the size of a display screen or correction of the shape thereof is in general performed by a user who is actually looking at the display screen.

Adjustment of the size of a display screen or correction of trapezoidal distortions can be seen as one form of coordinate conversion, and calculation therefor can be performed by computer. For example, one perspective and projection technique for three-dimensional (3D) graphics defines, as the display position of the object, the position where the line connecting the viewpoint and an object in a virtual 3D space intersects the projection plane. By determining the positional relationship between the projection plane and the viewpoint and which region of the projection plane should be actually displayed, adjustment of the size of a display screen and simulation for trapezoidal distortion corrections can be performed.

The display screen of a game, etc. usually displays graphical images (i.e., images illustrating a virtual world by presenting the background, characters, etc.) and graphical images (i.e., images showing the text of character speeches, explanations of the game, etc.) which are often superimposed in the form of a window display. The player plays the game by looking at graphical and text-containing images displayed on the television or computer display device that the player is using.

When using traditional game devices, in order to adjust the sizes of graphical and text-containing images to be displayed on the display screen, the player in general adjusted the size of the display screen by properly constructing settings of the aspect ratio (e.g., 4:3 or 16:9) and the display resolution of the display screen.

DISCLOSURE OF THE INVENTION

Problem to be Solved by the Invention

However, the viewability of the user looking at enlarged/contracted text-containing images differs from that of the user looking at enlarged/contracted graphical images.

Contracting graphical images to a certain extent does not result in significantly reducing the amount of information to be conveyed. However, when text-containing images are contracted, the text is blurred and become less legible.

Another problem is the situation where the user is watching the display screen of a large-screen television from a close range. When the displayed graphic image is too large, the graphic can occupy the entire field of view and obstruct the user from viewing the whole screen. Graphics in the field of view can look as if they are distorted in an unnatural manner, and "jaggies" of dots—artifacts on images—can become visibly noticeable.

Demands are strong for enhancing user viewability by properly adjusting the sizes of graphic and text-containing images according to the distance between the user and the display screen.

The present invention, by solving the above problems, is directed to providing a display device and a display method that are preferable for changing the size of text and graphics to be displayed on the display screen according to the distance between the display screen and the user looking thereat as well as for enhancing the viewability thereof. Also, the present invention is directed to providing a program for implementing the above method and device on a computer as well as a computer-readable information recording medium recording the program.

Means for Solving the Problem

To achieve the above objects, a disclosure of the invention is made below to present the concept of the present invention.

A display device in accordance with a first aspect of the present invention comprises a displaying unit, a measuring unit, an enlargement/contraction ratio acquiring unit, a text-containing image generating unit, a graphic image generating unit, and a control unit. These units have the features described below.

When the displaying unit is provided with a plurality of images, each of which is paired with an enlargement/contraction ratio, the images are enlarged/contracted at their respective ratios to be displayed on the display screen.

The displaying unit performs the so-called window display. When the displaying unit displays a plurality of images on the display screen, the images can be enlarged/contracted for display. As described later, it is common to set the display position of the images using the displaying unit. When one image overlaps another image, which one must be above and below is determined for overlay processing, whereby the image above covers the one below. In general, the display screen of a television is used.

The measuring unit measures the distance between the display screen and the user looking at an image displayed thereon.

In recent years, game devices employ a technique to measure the player position based on the principle of triangulation using infrared light, supersonic waves, and a CCD camera in order to determine the positional relationship between the player controller and the television (i.e., the display screen). This technique is commonly employed in the measuring unit.

For example, infrared light emitted from the controller is received by a plurality of infrared CCD cameras installed on the television to find the path of the infrared light so as to identify the position of the controller. In order to identify the same, supersonic waves are generated from the controller, and a plurality of supersonic wave microphones detect phase differences between the supersonic waves that have reached thereat.

The enlargement/contraction ratio acquiring unit acquires graphic enlargement/contraction and text enlargement/contraction ratios, both of which are determined based on the measured distance.

One of the characteristics of the present invention is that a graphic enlargement/contraction ratio for displaying a graphic on the display screen and a text enlargement/contraction ratio for displaying text thereon are separately acquired.

As the measured distance increases, the graphic enlargement/contraction ratio is set to increase. With any change in the acquired measured distance, the rate of change in the text enlargement/contraction ratio is set to be smaller than that in the graphic enlargement/contraction ratio.

As the user moves farther from the display screen, the size of a graphic image increases. As the user moves nearer to the display screen, the size of a graphic image decreases.

Also when the distance changes, the rate of change in the text enlargement/contraction ratio is smaller than that in the graphic enlargement/contraction ratio. In other words, the change in the size of a text-containing image is smaller than that of a graphic image.

The text-containing image generating unit generates a text-containing image with a specific size, which shows a string to be presented to the user.

In a text display window with a specific size, text with a specific font size is generally arranged to generate a text-containing image representing a string. In a game to which the present invention is applied, strings of character speeches and the like are presented in a text-containing image.

The graphic image generating unit generates a graphic image with a specific size, which is a graphic to be presented to the user.

Typically, the graphic image generating unit generates a 3D graphic image which represents the perspective and projection of a virtual space viewed from a specific viewpoint in a specific line of sight direction. Also, the graphic image generating unit displays (superimposes, if necessary) the background image and a character image in order to generate a two-dimensional (2D) graphic image representing the character at a certain location. A graphic image is also typically generated to fit in a graphic display window with a specific size.

First, the control unit controls the displaying unit. More specifically, the control unit provides the displaying unit with a pair of a generated graphic image and an acquired graphic enlargement/contraction ratio as well as a pair of a generated text-containing image and an acquired text enlargement/contraction ratio.

The control unit provides the displaying unit with a pair of a graphic image and a graphic enlargement/contraction ratio and a pair of a text-containing image and a text enlargement/contraction ratio. Then the displaying unit displays the graphic and text-containing images at their respective enlargement/contraction ratios on the display screen.

If the display region of the graphic image and that of the text-containing image overlap, an overlay display is usually made such that the latter image is on the former.

In the present invention, the enlargement/contraction ratio of a graphic image is processed for display separately from that of a text-containing image, based on the distance between the user and the display screen. The size of a graphic image can be changed quickly in response to a change in the aforesaid distance so that the user does not feel strange, and the display size of a text-containing image is changed slowly so as to enhance the viewability.

The text enlargement/contraction ratio acquired on a display device according to the present invention can be set constant regardless of the measured distance.

The present invention relates to the above preferred embodiment of the invention. Even if the distance between the user and the display screen changes, a text-containing image is displayed at a constant size. Therefore, the size of text does not change.

In the present invention, by setting the display size of a text-containing image constant regardless of the distance, the viewability thereof does not deteriorate due to text blurring.

Also on a display device according to the present invention, the graphic enlargement/contraction ratio can be, in a range between specified lower and upper limits, set proportional to the measured distance.

The present invention relates to the above preferred embodiment of the invention. In the above embodiment, when the distance between the display screen and the user is set proportional to the graphic enlargement/contraction ratio, the ratio of the area of a character displayed on the display screen to the area of the field of view of the user is constant. When this embodiment is applied to a gun action game, etc., the ratio of the area occupied by the target to the area of the field of view of the user is constant.

In the present invention, even when the distance between the display screen and the user changes, by setting constant the ratio of the area of a character to the area of the field of view of the user, visibly noticeable "jaggies" of dots do not make the user feel odd. By setting constant the ratio of the area of the target to the area of the field of view of the user regardless of his/her distance to the display screen, the difficulty level of the game does not change significantly.

Further in a display device according to the present invention, when the displaying unit is further provided with the display positions of images, the displaying unit displays the images that are enlarged/contracted at given enlargement/contraction ratios at the display positions on the display screen. The control unit controls the displaying unit so that the whole display regions of graphic and text-containing images fit within the display screen. When the measured distance decreases, the control unit provides the displaying unit with the display positions of the graphic and text-containing images on the display screen, so that the area of overlap between the display regions of the graphic and text-containing images decreases on the display screen.

When the area of the region of a graphic image and that of the region of a text-containing image change on the display screen, as described above, the two regions eventually overlap. In this kind of overlay display, the user cannot see the information displayed in the hidden region when one of the regions hides the other. As the overlapping area of the overlaid images decreases, the amount of information conveyed to the user increases.

The present invention is directed to addressing this kind of situation. Display position control can be performed so that the whole regions of graphic and text-containing images are displayed on the display screen, while addressing the need to decrease the area where these images overlap.

In the present invention, by reducing to a minimum the area where overlaid graphic and text-containing images overlap, the amount of image information provided to the user can be increased as much as possible.

In a display device according to the present invention, the control unit sets on the display screen a predetermined graphic reference position, a predetermined graphic reference direction, a predetermined text reference position, and a predetermined text reference direction, so that an obtuse angle is formed between the graphic reference direction and the text reference direction. The control unit controls the displaying unit by providing the displaying unit with the display positions of graphic and text-containing images on the display screen. As a result, when the measured distance decreases, the display position of the graphic image gradually moves from the predetermined graphic reference position in the predetermined graphic reference direction, and the display position of the text-containing image gradually moves from the predetermined text reference position in the predetermined text reference direction.

The present invention relates to the above preferred embodiment of the invention. As the user moves nearer to the display screen, the distance increases between the display positions of graphic and text-containing images. As the user moves farther from the display screen, the distance therebetween decreases.

If the user remembers the relative positional relationship between the graphic and text-containing images, the user can easily find out whether his/her distance to the display screen has changed from the previous game to the current game.

According to this embodiment of the present invention, the user can easily find his/her distance to the display screen.

A display method according to another aspect of the present invention comprises a displaying step, a measuring step, an enlargement/contraction ratio acquiring step, a text-containing image generating step, a graphic image generating step, and a control step. These steps have the features described below.

The display method according to the present invention is typically performed by a display device comprising a displaying unit, a measuring unit, an enlargement/contraction ratio acquiring unit, a text-containing image generating unit, a graphic image generating unit, and a control unit. A typical embodiment is referred to in the explanations to follow.

When a plurality of images, each of which is paired with an enlargement/contraction ratio, are provided in the displaying step, the displaying unit enlarges/contracts the images at their respective enlargement/contraction ratios and displays the images on the display screen.

In the measuring step, the measuring unit measures the distance between the display screen and the user looking at an image displayed thereon.

In the enlargement/contraction ratio acquiring step, the enlargement/contraction ratio acquiring unit acquires text and graphic enlargement/contraction ratios, which are determined according to the measured distance.

In the text-containing image generating step, the text-containing image generating unit generates a text-containing image with a specific size showing a string to be presented to the user.

In the graphic image generating step, the graphic image generating unit generates a graphic image with a specific size showing a graphic to be presented to the user.

In the control step, the control unit controls the displaying step. More specifically, the control unit controls the displaying step by passing to the displaying step a pair of a generated graphic image and an acquired graphic enlargement/contraction ratio as well as a pair of a generated text-containing image and an acquired text enlargement/contraction ratio.

The graphic enlargement/contraction ratio is set to increase as the measured distance increases. The acquired text enlargement/contraction ratio is set to be greater than the acquired graphic enlargement/contraction ratio.

A program according to yet another aspect of the present invention causes a computer to act as the above display device, so that the computer performs the above display method.

The program according to the present invention may be recorded in a computer readable information storage device, such as a compact disc, a flexible disk, a hard disk, a magnetic optical disk, a digital video disk, a magnetic tape, or a semiconductor memory.

The above program may be sold and distributed via a computer communication network, separately from a computer on which it is executed. The above information storage device may be sold and distributed, separately therefrom as well.

Effect of the Invention

By the present invention, a display device and a display method that are preferable for changing the size of text and graphics to be displayed on the display screen according to the distance between the display screen and the user looking thereat as well as for enhancing the viewability thereof can be provided. A program for implementing the above method and device on a computer and a computer-readable information recording medium recording the program can be provided thereby as well.

BRIEF DESCRIPTION OF DRAWINGS

FIG. 2 is an explanatory diagram illustrating exterior views of a controller and information processing devices for measuring various parameters, such as orientations and positions in a real space.

Figure 1:
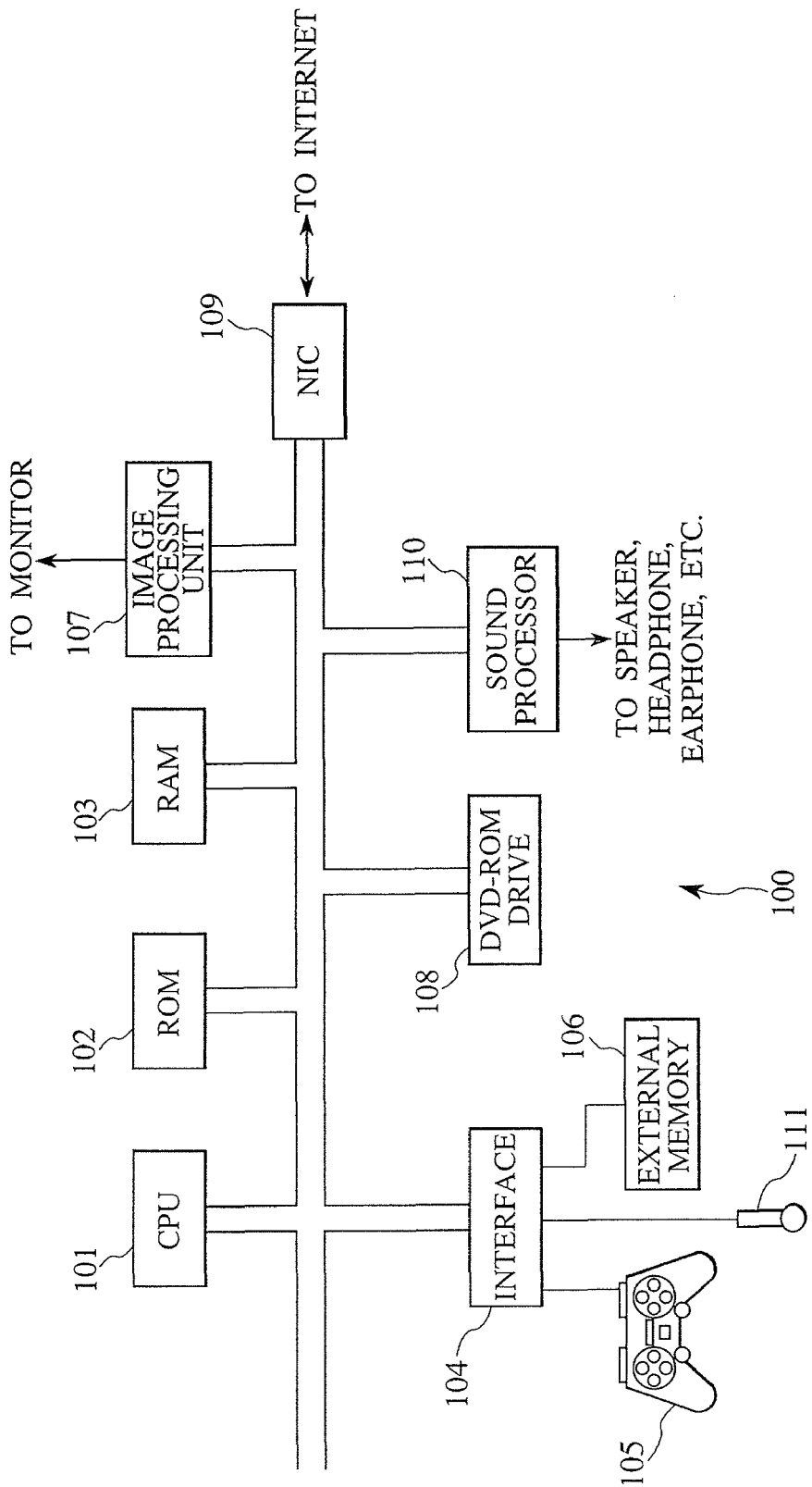
FIG. 1 is a schematic diagram illustrating main features of a typical information processing device that executes a program to serve as a display device according to the present invention.

EXPLANATION OF REFERENCE NUMERALS 100 information processing device
101 CPU
102 ROM
103 RAM
104 interface
105 controller
106 external memory
107 image processing unit
108 DVD-ROM drive
109 NIC
110 sound processing unit
111 microphone 201 hand held module
202 CCD camera
203 cross-shaped key
204 A button
205 B button
206 other buttons
207 indicator
208 power supply button
251 light emitting module
252 light emitting diode
291 television
301 display device
302 displaying unit
303 measuring unit
304 enlargement/contraction ratio acquiring unit
305 text-containing image generating unit
306 graphic image generating unit
307 control unit
401 display screen
402 graphic image
403 text-containing image

BEST MODE FOR CARRYING OUT THE INVENTION

Embodiments of the present invention are explained below. For the ease of understanding, an information processing device for games is used to explain embodiments in which the present invention is achieved. However, the embodiments below are described for the purpose of explanation, and the scope of the present invention is in no way restricted thereby. One of ordinary skill in the art can achieve embodiments of the present invention that are different from the embodiments below by substituting some or all of the components of the embodiments below. Such embodiments are also within the scope of the present invention.

Embodiment 1

FIG. 1 is a schematic diagram illustrating main features of a typical information processing device that executes a program to serve as a display device according to the present invention. This figure is referred to in the explanations to follow.

An information processing device 100 comprises a Central Processing Unit (CPU) 101, a ROM 102, a Random Access Memory (RAM) 103, an interface 104, a controller 105, an external memory 106, an image processing unit 107, a Digital Versatile Disc ROM (DVD-ROM) drive 108, a Network Interface Card (NIC) 109, a sound processing unit 110, and a microphone 111.

By inserting a DVD-ROM storing the program and data of a game into the DVD-ROM drive 108 and turning on the power of the information processing device 100, the program is launched, and the device according to this embodiment is achieved.

The CPU 101 controls the overall operation of the information processing device 100 and is connected with other components for exchanging control signals and data. The CPU 101 uses an Arithmetic Logic Unit (ALU) (not shown) to perform four arithmetic operations (addition, subtraction, multiplication, and division), logical operations (logical addition, logical multiplication, logical NOT, etc.), and bit operations (bitwise OR, bitwise AND, bit inversion, bit shift, bit rotation, etc.) in a fast-access storage area called a register (not shown). The CPU 101 may be designed to, either by itself or with the assistance of a coprocessor, perform saturate calculations (four arithmetic operations for multimedia processing), vector calculations (trigonometric calculations, etc.), and the like at high speeds.

In the ROM 102, an Initial Program Loader (IPL), which is executed immediately after the power is turned on, is recorded. Upon execution of the IPL, the program recorded in a DVD-ROM is read out to the RAM 103 for execution by the CPU 101. Programs and data of the operating system required for the overall control and operation of the information processing device 100 are also recorded in the ROM 102.

The RAM 103 is used for temporary storage of data and programs. The RAM 103 holds data and programs read out from the DVD-ROM as well as other data needed for the progress of the game and chat communications. The CPU 101 sets a variable area in the RAM 103 and sends a value stored in the storage area directly to the ALU for operation to be performed thereby. Also, the CPU 101 stores temporarily in the register a value stored in the RAM 103, performs an operation in the register, and writes the operation results back to the memory.

The controller 105, which is connected via the interface 104, receives operation inputs from the user for game play. For the controller 105 according to this embodiment, the hand held module 201 and the light emitting module 251 are used. The details of the controller 105 are described below.

The external memory 106 is detachably connected via the interface 104. Data rewritably recorded in the external memory 106 include data on the player performance in the game, etc. (past results, etc.), the progress of the game, and logs (records) of chat communications for a network match-up. The user can appropriately record such data in the external memory 106 by inputting instructions via the controller 105.

In a DVD-ROM to be mounted on the DVD-ROM drive 108, a program for executing the game as well as image and sound data that accompany therewith are recorded. Under control of the CPU 101, the DVD-ROM drive 108 reads out, from the DVD-ROM mounted thereon, required programs and data. The above program and data are stored temporarily in the RAM 103, etc.

The image processing unit 107, upon processing of data read out from the DVD-ROM by an image operation processor (not shown) comprised in the image processing unit 107 or the CPU 101, records the data in a frame memory (not shown) comprised in the image processing unit 107. The image information recorded in the frame memory is converted into video signals at a predetermined synchronization timing and output to a monitor (not shown) connected to the image processing unit 107. Many kinds of image display are thereby enabled.

The image operation processor can perform overlay calculation for 2D images, transparent operations (alpha blending, etc.), and many kinds of saturate calculation at high speeds.

When a virtual space is 3D, it is also possible to perform a high-speed operation to acquire a rendering image from polygon information, which is arranged within the virtual 3D space and to which various kinds of texture information are added. In such an operation, the Z buffer method is used for rendering polygon information to acquire a rendering image in which a polygon in a virtual space can be seen from a predetermined viewpoint in a predetermined line of sight direction.

Further, by cooperation of the CPU 101 and the image operation processor, a string can be presented as a 2D image in the frame memory or on each polygon surface according to font information defining text shapes.

The NIC 109 is used for connecting the information processing device 100 to a computer communication network (not shown), such as the Internet. The NIC 109 comprises ones compliant with the 10 BASE-T/100 BASE-T standard which is used to configure a Local Area Network (LAN), an analog modem for Internet connection via a telephone circuit, an Integrated Services Digital Network (ISDN) modem, an Asymmetric Digital Subscriber Line (ADSL) modem, a cable modem for Internet connection via a cable television circuit and the like, and an interface (not shown) which intervenes between these modems and the CPU 101.

The sound processing unit 110 converts, into an analog sound signal, sound data read out from the DVD-ROM and outputs the sound signal from a speaker (not shown) connected thereto. Under control of the CPU 101, the sound processing unit 110 generates sound effects and music data to be generated during the game and outputs sounds corresponding thereto from the speaker.

When the sound data recorded in the DVD-ROM is MIDI data, the sound processing unit 110 refers to the sound source data included in the sound data and converts the MIDI data into PCM data. When the sound data is compressed sound data in the Adaptive Differential Pulse Code Modulation (ADPCM) format, the Ogg Vorbis format, or the like, the sound processing unit 110 decompresses the data and converts it to PCM data. The PCM data is, upon (digital/analog) D/A conversion at a timing corresponding to the sampling frequency of the PCM data, output to the speaker, thereby enabling sound output.

The information processing device 100 can be connected to the microphone 111 via the interface 104. In this setting, A/D conversion is performed for analog signals from the microphone 111 at an appropriate sampling frequency, so that the signals are processed as PCM-format digital signals for mixing or the like by the sound processing unit 110.

In addition, the information processing device 100 may use a large-capacity external storage device, such as a hard disk, so that the information processing device 100 has the functions of the ROM 102, the RAM 103, the external memory 106, a DVD-ROM loaded onto the DVD-ROM drive 108, or the like.

The information processing device 100, as explained above, is an equivalent of the so-called "TV Game Device for Consumers". Any device that performs image processing for virtual space display can be used to achieve the present invention. The present invention can be achieved on many kinds of computing devices, such as cellular phones, portable game devices, karaoke devices, and computers generally used for business.

For example, ordinary computers, like the information processing device 100, comprise a CPU, a RAM, a ROM, a DVD-ROM drive, an NIC, an image processing unit with features not as advanced as those of the information processing device 100, and a hard disk as an external storage device. They are also designed to be able to use a flexible disk, a magnetic optical disk, a magnetic tape, etc. Input devices they use include not the controller 105, but a keyboard and a mouse.

This embodiment employs the controller 105, whereby various parameters, such as orientations and positions in a real space, can be measured.

FIG. 2 is an explanatory diagram illustrating exterior views of the controller 105 and the information processing device 100, whereby various parameters, such as orientations and positions in a real space, can be measured. This figure is referred in the explanations to follows.

The controller 105 comprises a combination of the hand held module 201 and the light emitting module 251. The hand held module 201 is communicably connected to the information processing device 100 through the air. The light emitting module 251 is communicably connected to the information processing device 100 by cable. Sound and images processed by the information processing device 100 are output and displayed by a television 291.

The hand held module 201 has an exterior appearance similar to that of the remote controller of the television 291. The CCD camera 202 is provided at the front end of the hand held module 201.

The light emitting module 251 is fixed to an upper portion of the television 291. The light emitting diodes 252, each of which is placed at one of the two ends of the light emitting module 251, emits light using power supply from the information processing device 100.

The CCD camera 202 of the hand held module 201 takes a photograph of the light emitting module 251.

The photographed image information is sent to the information processing device 100, which acquires the position of the hand held module 201 with respect to the light emitting module 251 based on the positions of the light emitting diodes 252 in the photographed image.

Built-in components of the hand held module 201 include an acceleration sensor, an angular acceleration sensor, and a slope sensor. The hand held module 201 can measure its own orientation, whose results are transmitted to the information processing device 100.

On the upper surface of the hand held module 201, a cross-shaped key 203 is provided. The player presses the cross-shaped key 203 to input instructions regarding the direction. A button A 204 and buttons 206 are also provided on the upper surface for input of respective instructions assigned thereto.

A button B 205 is provided on the lower surface of the hand held module 201. Coupled with a recess formed thereon, this button simulates the trigger of a rifle or a magic hand. In general, an instruction is input via the button B 205 for holding by a magic hand or shooting by rifle in a virtual space.

An indicator 207 on the upper surface of the hand held module 201 presents the player with the operation status of the hand held module 201, the status of wireless communications with the information processing device 100, and the like.

A power supply button 208 provided on the upper surface of the hand held module 201 turns on and off the hand held module 201. The hand held module 201 is powered by a built-in battery (not shown).

The hand held module 201 is also provided with a vibrator (not shown) inside. The vibrator can control the level of vibration according to instructions from the information processing device 100.

The CCD camera 202 may be located on the side of the information processing device 100 and the television 291 (on the side of the light emitting module 251 according to the above embodiment), and the hand held module 201 may be provided with the light emitting diodes 252. In this setting, by providing a plurality of CCD cameras 202, the relative position of the hand held module 201 with respect to the television 291 and the distance therebetween can be found based on the principle of triangulation.

To explain a next embodiment, it is assumed that the controller 105, in which the hand held module 201 is combined with the light emitting module 251, is used to measure its own real-world position and orientation. The real-world position and orientation of the controller 105 can be measured using supersonic waves, infrared communication, the Global Positioning System (GPS), or the like in order to obtain the relative position of the controller 105 with respect to the television 291. Such an embodiment deviates from the above embodiment, but it is still within the scope of the present invention.

Figure 3:
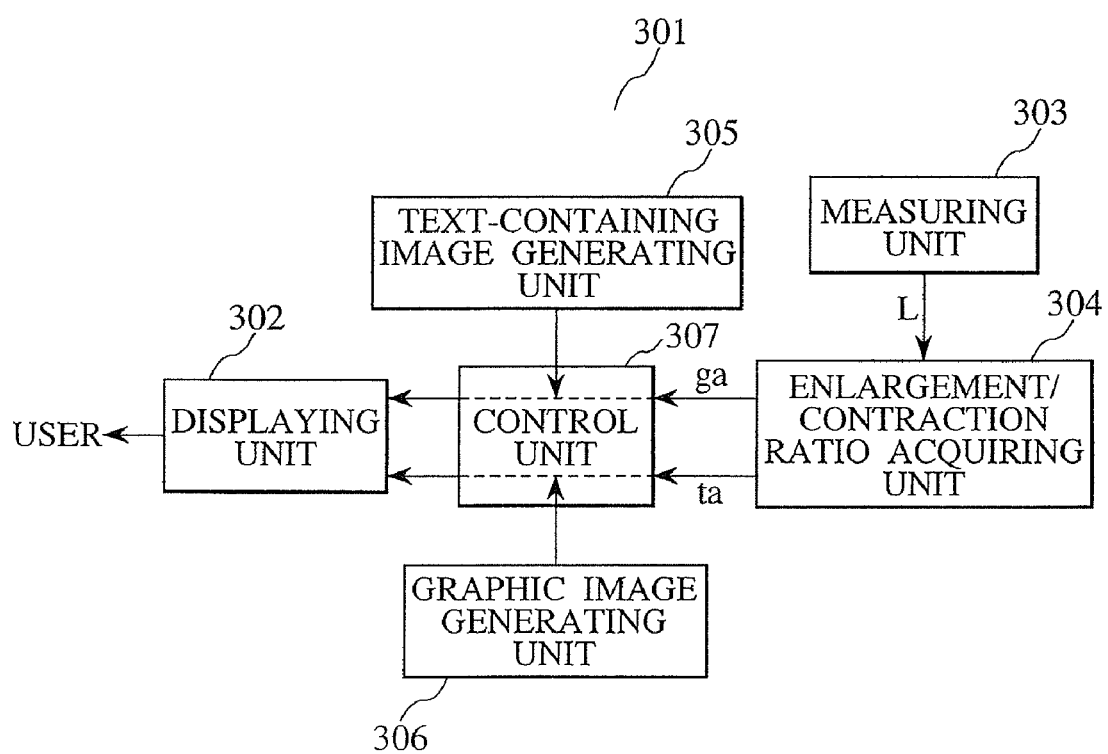
FIG. 3 is an explanatory diagram illustrating main features of a display device according to an embodiment of the present invention.

FIG. 3 is an explanatory diagram illustrating main features of a display device according to an embodiment of the present invention. This figure is referred to in the explanations to follow.

A display device 301 comprises a displaying unit 302, a measuring unit 303, an enlargement/contraction ratio acquiring unit 304, a text-containing image generating unit 305, a graphic image generating unit 306, and a control unit 307.

When provided with an image and its enlargement/contraction ratio and display position, the displaying unit 302 enlarges/contracts the image according to the ratio for display (and overlay, if necessary) on the display screen.

The displaying unit 302 performs so-called window display. When displaying a plurality of images on the display screen, the displaying unit 302 enlarges/contracts the images. Also, the display position of an image on the display screen can be specified for use by the displaying unit 302. When the display regions of images overlap, the displaying unit 302 determines which image is above and which image is below so as to perform overlay processing, whereby one image partially hides the other one therebelow.

According to this embodiment, overlay processing is executed by the image processing unit 107 under control of the CPU 101. The display screen to be used is that of the television 291.

Images to be finally displayed on the display screen of the television 291 are deployed in a frame buffer in the RAM 103 and are processed at each vertical synchronizing interruption by the image processing unit 107.

As an image is specified for the displaying unit 302, the image is enlarged/contracted at a specified enlargement/contraction ratio at a specified display position in the frame buffer. This set of steps is performed each time an image is specified, and each image thus specified can be regarded as a display window. When one image is specified first and another image is specified thereafter, overlay display is performed for two windows such that the window below displays the former image and that the window above displays the latter image.

Several types of images can be displayed on the display screen. According to this embodiment, there are at least two types of images displayed on the display screen: graphic images and text-containing images.

Graphic images (including objects such as other characters and targets in a gun action game) are used for generating 3D graphic images, whose perspective and projection are in a predetermined line of sight direction from a predetermined viewpoint in a virtual space. Also, graphic images are equivalents of 2D graphic images showing a character at a certain location, which is produced by overlaying the character image on the background image.

Text-containing images present strings of characters' speeches and numerical strings of the values of parameters representing the game situation. Text-containing images are produced by placing text with a predetermined font size in a text display window with a predetermined size.

The text-containing image generating unit 305 generates text-containing images, and the graphic image generating unit 306 generates graphic images. In cooperation with the RAM 103, the image processing unit 107, etc., the CPU 101 acts as the text-containing image generating unit 305 and the graphic image generating unit 306. These images are generally generated each time vertical synchronization interrupt is performed.

In a traditional game screen, the following sizes were adopted:

size of display screen: width (W)=640 dots×height (H)=480 dots;

size of graphic image: width (p)=620 dots×height (q)=460 dots; and size of text-containing image: width (r)=600 dots× height (s)=140 dots.

FIG. 4 presents explanatory diagrams illustrating the sizes of the traditional display screen, a graphic image, and a text-containing image as well as their positional relationship.

Figure 4A:
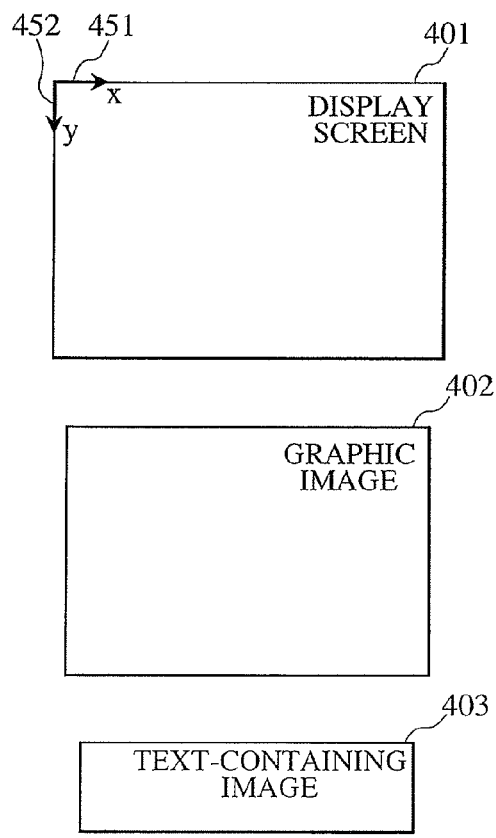
FIG. 4(a) is an explanatory diagram illustrating the sizes of a display screen, a graphic image, and a text-containing image.
Figure 4B:
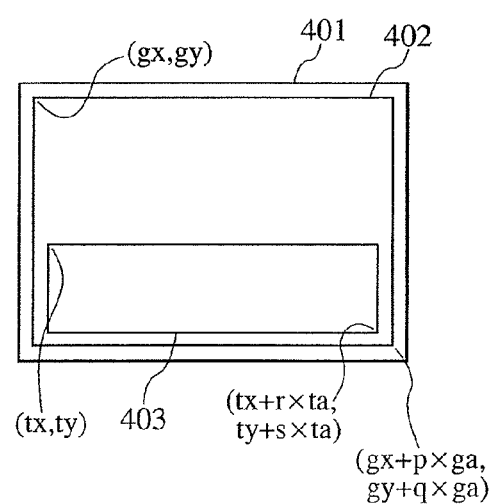
FIG. 4(b) is an explanatory diagram illustrating their positional relationship when the images are actually displayed on the display screen.

FIG. 4(a) is an explanatory diagram illustrating the sizes of the traditional display screen, a graphic image, and a text-containing image. FIG. 4(b) is an explanatory diagram illustrating their positional relationship when the images are displayed on the display screen.

As illustrated in FIG. 4(b), a graphic image 402 is displayed at the center of a display screen 401, and a text-containing image 403 is overlaid on the lower half of the graphic image 402. The distances from the left, right, and lower sides of the text-containing image 403 to their opposing edges of the display screen 401 are all equal.

The user can read text information appearing on the text-containing image 403, but the user cannot see the graphic image 402, which is covered by the text information (however, the graphic image 402 can be seen through the text-containing image 403 when the text-containing image 403 is either transparent or semi-transparent).

The display positions and enlargement/contraction ratios of the graphic image 402 and the text-containing image 403 on the traditional display screen 401 are assumed as their reference display positions and enlargement/contraction ratios. On the display screen 401, the horizontal and vertical directions are set, respectively, to an x axis 451 and a y axis 452, and the upper left corner is the origin. In this standard display coordinate system, the reference display positions and enlargement/contraction ratios of the graphic image 402 and the text-containing image 403 are given as follows:

display position of graphic image 402 (gx, gy)=(10, 10);

enlargement/contraction ratio of graphic image 402 ga=1.0;

display position of text-containing image 403 (tx, ty)=(20, 320); and enlargement/contraction ratio of text-containing image 403 ta=1.0.

In general, in order for the graphic image 402 and the text-containing image 403 to be entirely within the bounds of the display screen 401, the following inequalities must hold true:

$$0 \leq gx < gx + p \times ga < W, \ 0 \leq gy < gy + q \times ga < H; \text{ and}$$

$$0 \leq tx < tx + r \times ta < W, \ 0 \leq ty < ty + s \times ta < H.$$

If not, the graphic image 402 and the text-containing image 403 are, in whole or in part, out of the bounds of the display screen 401. It means there is a region of an image that is not viewable for the user.

Meanwhile, the measuring unit 303 measures the distance between the display screen and the user looking at an image displayed on the display screen.

As mentioned above, the user is holding the hand held module 201 in his/her hand, so the distance between the light emitting module 251 and the hand held module 201 can be regarded as the distance (or an approximate value thereof) between the user and the display screen. The hand held module 201, the light emitting module 251, and the CPU 101 work together to serve as the measuring unit 303.

In this embodiment, it is assumed that there is a user right in front of the television 291. However, the user may be lying down or watching the television 291 in an oblique direction. In these situations, the distance between the vertical line, which runs downward from the hand held module 201, and the plane containing the display screen of the television 291 may be regarded as the distance between the user and the display screen. The distance to the hand held module 201 from the center of the display screen of the television 291 or from that of the light emitting module 251 can be used as well.

Figure 5:
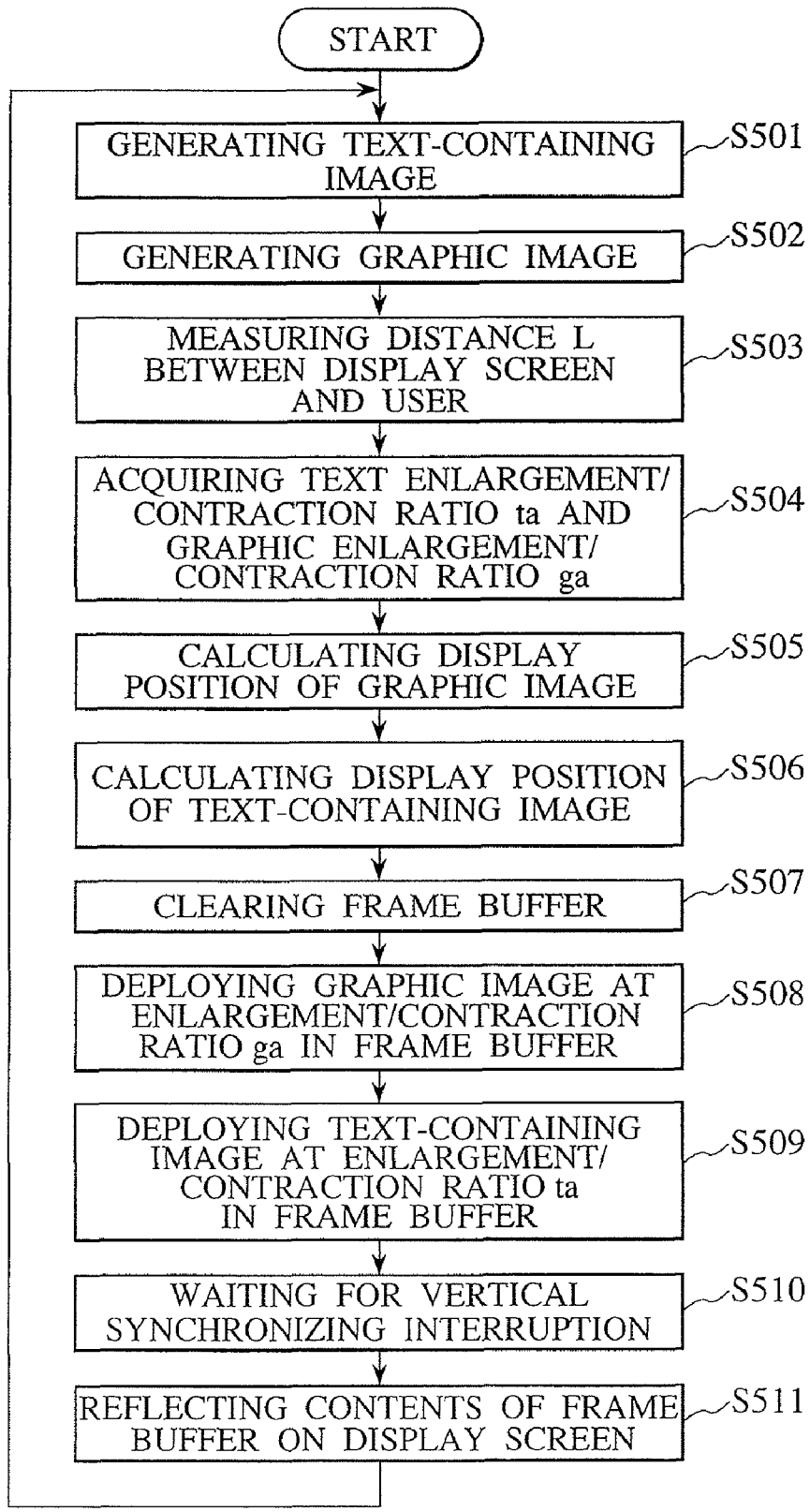
FIG. 5 is a flowchart illustrating the flow of controlling the display method to be performed by a display device according to an embodiment of the present invention.

Using the above hardware devices, the CPU 101 performs the process described below. FIG. 5 is a flowchart illustrating the flow of controlling the display method to be performed by a display device according to this embodiment. This figure is referred to in the explanations to follow.

After the process starts, under control of the CPU 101, the text-containing image generating unit 305 generates a text-containing image 403, which presents a string to be presented to the user (step S501). Also under control of the CPU 101, the graphic image generating unit 306 generates a graphic image 402, which is a graphic to be presented to the user (step S502). The specifics of the text-containing image 403 and the graphic image 402 are described above.

Next, the CPU 101 instructs the measuring unit 303 to measure a distance L between the user and the display screen (step S503). The measured distance L is stored in a register of the CPU 101, the RAM 103, and the like. To address an error contained in the distance L due to the effects of shaking, an average value in a predetermined time period or a decay average value should be adopted, in lieu of a real-time measured value, as a measured value representing the distance L.

Next, the enlargement/contraction ratio acquiring unit 304 acquires, from the measured distance L, a text enlargement/contraction ratio ta and a graphic enlargement/contraction ratio ga (step S504). These values are for example acquired by computation based on the following methods:

(1) The graphic enlargement/contraction ratio ga is set proportional to the distance L in a certain range. Using a predetermined upper limit constant K, the following equations can be produced:

$$ga = L/K (L<K); \text{ and}$$

$$ga = 1.0 (L \geq K).$$

In addition, using a predetermined lower limit constant M, the following equations can be produced:

$$ga = M/K (L<M);$$

$$ga = L/K (M \leq L<K); \text{ and}$$

$$ga = 1.0 (K \leq L).$$

In the above methods, the rate of change in the graphic enlargement/contraction ratio ga with respect to the distance L, which is represented by (d/dL)ga, is 1/K or 0. Here, (d/dL) denotes a differential operator, which means that differentiation is performed with respect to the distance L.

In these methods, the ratio of the area of graphics (typically, those of game characters and targets in a gun action game, etc.), which are in the graphic image 402 on the display screen 401, to the area of the field of view of the user is constant.

The ratio of the area of characters to the area of the field of view of the user is thereby made constant without respect to the distance to the display screen. Then the display screen does not look odd to the user due to noticeable "jaggies" of dots. Since the ratio of the area of targets to the area of the user field of view is constant without respect to the distance to the display screen, it is possible to limit changes in the level of difficulty of the game.

(2) The text enlargement/contraction ratio ta is set constant at 1.0, which is represented by the following equation:

$$ta = 1.0.$$

In this method, the rate of change in the text enlargement/contraction ratio ta with respect to the distance L, which is represented by (d/dL)ta, is 0.

Therefore, the following inequality can be established:

$$(d/dL)ta \leq (d/dL)ga.$$

In this case, the text is not blurred, and its legibility is not deteriorated.

(3) Using a constant N (>K), the text enlargement/contraction ratio ta can be given as follows:

$$ta = L/N (L<N); \text{ and}$$

$$ta = 1.0 (L>K),$$

or $$ta = M/N (L<M);$$

$$ta = L/N (M \leq L<N); \text{ and}$$

$$ta = 1.0 (N \leq L).$$

In the above cases, the rate of change in the text enlargement/contraction ratio ta with respect to the distance L, which is denoted by (d/dL)ta, is 1/N or 0. Since N>K holds true and therefore 1/N<1/K holds true as well, the following inequality can be established:

$$(d/dL)ta \leq (d/dL)ga.$$

(4) Let there be two tables in which the rate of change increases with an increase in the distance L. The one with a greater rate of increase is to be used for an image rate of change ga. The other one is to be used for an image rate of change ta.

This embodiment is characterized in handling the text enlargement/contraction ratio ta and the graphic enlargement/contraction ratio ga separately by employing the above methods.

In this embodiment, the CPU 101 acts as the enlargement/contraction ratio acquiring unit 304.

The CPU 101 calculates the display position (gx, gy) of the graphic image 402 on the display screen 401 (step S505) and the display position (tx, ty) of the text-containing image 403 on the display screen 401 (step S506).

The methods for calculating the display position (gx, gy) of the graphic image 402 and the display position (tx, ty) of the text-containing image 403 are as follows:

(a) (gx, gy) and (tx, ty) are assumed to be constants. In the example presented in FIG. 4, (gx, gy)=(10, 10) and (tx, ty)=(20, 230). These values are used as-is with any enlargement/contraction ratio.

(b) Let the values of (gx, gy) and (tx, ty), which are given by the equations below using a proper constant cy, be changed according to the graphic and text enlargement/contraction ratios:

$$gx = (W - p \times ga)/2, gy = (H - q \times ga)/2; \text{ and}$$

$$tx = (W - r \times ta)/2, ty = cy - s \times ta/2.$$

For the text-containing image 403 to be entirely within the bounds of the display screen 401, the following inequalities must hold true:

$$0 \leq cy - s \times ta/2,\ cy + s \times ta/2 \leq H$$

These inequalities can be modified as follows:

$$s \times ta/2 \leq cy \leq H - s \times ta/2.$$

Let the values of (gx, gy) and (tx, ty), which are given by the equations below, be changed according to the graphic and text enlargement/contraction ratios:

$$gx = (W-p) \times ga/2,\ gy = (H-q) \times ga/2;\ \text{and}$$

$$tx = W - (W-r) \times ta/2,\ ty = H - (H-s) \times ta/2.$$

Figure 6A:
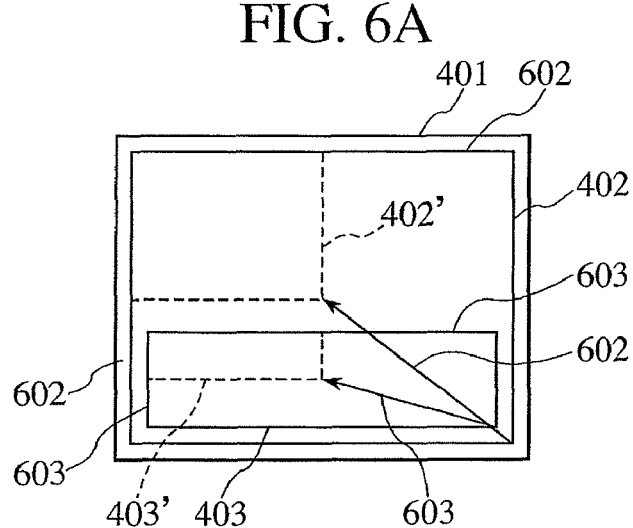
FIGS. 6(a), (b), and (c) are explanatory diagrams illustrating the sizes of and positional relationship among a display screen, a graphic image, and a text-containing image of methods (a), (b), and (c), respectively.
Figure 6B:
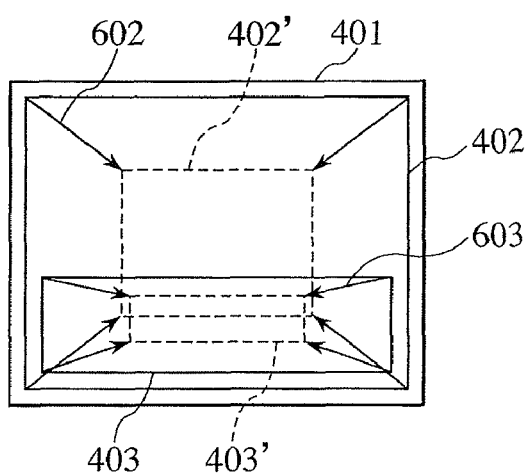
Figure 6C:
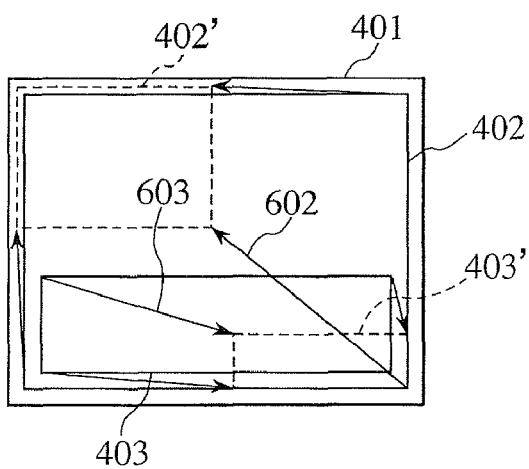

FIG. 6 are explanatory diagrams illustrating the sizes of a display screen, a graphic image, and a text-containing image as well as positional relationships thereamong based on the above three methods. This figure is referred to in the explanations to follow.

In method (a) above, as illustrated in FIG. 6(*a*), the graphic image 402 and the text-containing image 403 have their upper left corners fixed in the region where they are displayed. The lower right corner of the graphic image 402 moves in a direction 602 for expansion (contraction), and that of the text-containing image 403 moves in a direction 603 for expansion (contraction) as well.

In method (b) above, as illustrated in FIG. 6(*b*), the center of the graphic image 402 always agrees with that of the display screen 401. Also, the center of the text-containing image 403 always agrees with the coordinate position (w/2, cy) on the display screen 401.

In method (c) above, as illustrated in FIG. 6(*c*), when the user moves nearer to the display screen 401, the graphic image 402 is contracted as it moves toward the upper left corner of the display screen 401. The text-containing image 403 is also contracted as it moves toward the lower right corner of the display screen 401. The angle between the moving directions of these two images is a blunt one.

In each of these methods, as the distance between the user and the display screen 401 decreases, the area of overlap decreases between the text-containing image 403 and the graphic image 402.

By reducing to a minimum the area of overlap between the graphic image 402 and the text-containing image 403, which is overlaid on the graphic image 402, the image area not viewable for the user decreases. A greater amount of image information can be thereby conveyed to the user.

In method (c) above, the graphic image 402 and the text-containing image 403 are normally separated from each other. If the distance therebetween is stored before stopping playing the game and turning off the power, the user can check the positional relationship between the graphic image 402 and the text-containing image 403 when the user plays the same game again later. The user can thereby easily check the distance to the television 291 is the same as that when the user last played the same game.

After the display position (gx, gy) and the graphic enlargement/contraction ratio ga of the graphic image 402 and the display position (tx, ty) and the graphic enlargement/contraction ratio ta of the text-containing image 403 are acquired, the CPU 101 clears the frame buffer, whose contents are readily available for the RAM 103 (step S507).

The graphic image 402 as well as its display position (gx, gy) and graphic enlargement/contraction ratio ga are provided to the displaying unit 302 (step S508). The graphic image 402 is thereby appropriately enlarged/contracted and deployed in the frame buffer.

The text-containing image 403 as well as its display position (tx, ty) and graphic enlargement/contraction ratio ta are provided to the displaying unit 302 (step S509). The text-containing image 403 is thereby appropriately enlarged/contracted and deployed in the frame buffer. At this time, the text-containing image 403 is overlaid on the graphic image 402 for display.

If the text-containing image 403 is non-transparent, the pixels of the text-containing image 403 should be overwritten to the corresponding pixels of the graphic image 402, which is disposed under the text-containing image 403. If the text-containing image 403 is semi-transparent, alpha blending should be performed appropriately.

In cooperation with the RAM 103 and the like, the CPU 101 acts as the control unit 307.

The CPU 101 stands by until vertical synchronizing interruption occurs (step S510). During this "stand-by" period, the CPU 101 may perform another process as in a manner that a coroutine is executed.

Upon occurrence of vertical synchronizing interruption, the CPU 101 instructs the image processing unit 107 to reflect the contents of the frame buffer in the RAM 103 on the display screen 401 of the television 291 (step S511). Then the process goes back to step S501, and actual display is performed.

In this embodiment, different enlargement/contraction ratios are set to a graphic image and a text-containing image depending on the distance from the user to the display screen. The display size of a graphic image changes swiftly in response to changes in the distance so that it does not look odd to the user. The display size of the text-containing image changes slowly for enhanced viewability.

In addition to the process to be performed according to this embodiment, correction of trapezoidal distortions may be performed. When trapezoidal distortion correction is performed for a projection device (a projector, etc.), the condition of the center axis of the projector lens not being orthogonal to the screen is corrected. This condition is an equivalent of the condition where a line originating from the user to the display screen 401 does not pass through the center thereof. As in the case of a projector and the like, by performing trapezoidal distortion correction for the graphic image 402 and the text-containing image 403, graphics can be presented in a shape as natural as possible.

When trapezoidal distortion correction is performed for the text-containing image 403, the text may be blurred. A method without trapezoidal distortion correction may be adopted for the text-containing image 403. Since the graphic image 402 and the text-containing image 403 are processed separately, such a method can be easily adopted in the present invention.

A priority right of the present application is based on Japanese Patent Application No. 2006-279615, whose filing date is Oct. 13, 2006. Within the scope of the domestic laws and regulations of the designated country, the contents of the base application are incorporated herein by reference.

INDUSTRIAL APPLICABILITY

As explained above, in the present invention, the sizes of text and graphics to be displayed on the display screen are changed depending on the distance between the display screen and the user looking at the screen for improved viewability. A display device and a display method preferable therefor, a program for implementing the display device and display device on a computer, and a computer-readable information recording medium that records the program can be provided.

The invention claimed is:

1. A display device comprising:

a displaying unit which enlarges/contracts, when images and enlargement/contraction ratios are provided in a plurality of pairs, the images at the enlargement/contraction ratios and displays the images on a display screen;

a measuring unit which measures a distance between the display screen and a user looking at images displayed on the display screen;

an enlargement/contraction ratio acquiring unit which acquires text and graphic enlargement/contraction ratios determined based on the measured distance;

a text-containing image generating unit which generates a text-containing image with a predetermined size which represents a string to be presented to the user;

a graphic image generating unit which generates a graphic image with a predetermined size which represents a graphic to be presented to the user; and a control unit which controls the displaying unit by giving a pair of the generated graphic image and the acquired graphic enlargement/contraction ratio to the displaying unit and by giving a pair of the generated text-containing image and the acquired text enlargement/contraction ratio to the displaying unit, wherein:

as the measured distance increases, the graphic enlargement/contraction ratio is set to increase;

when the measured distance changes, a rate of change in the text enlargement/contraction ratio is set to be smaller than a rate of change in the graphic enlargement/contraction ratio;

the displaying unit, when display positions of the images are also given, enlarges/contracts the images at the display positions on the display screen;

the control unit controls the displaying unit by giving a display position of the graphic image and a display position of the text-containing image on the display screen to the displaying unit, such that a display region of the graphic image and a display region of the text-containing image are entirely within bounds of the display screen and such that as the measured distance decreases, and area of overlap decreases between the display region of the graphic image and the display region of the text-containing image on the display screen;

the control unit sets on the display screen a predetermined graphic reference position, a predetermined graphic reference direction, a predetermined text reference position, and a predetermined text reference direction such that the predetermined graphic reference direction and the predetermined text reference direction form a blunt angle; and the control unit controls the displaying unit by giving a display position of the graphic image and a display position of the text-containing image on the display screen to the displaying unit such that as the measured distance decreases, the display position of the graphic image gradually moves from the predetermined graphic reference position in the predetermined graphic reference direction and the display position of the text-containing image gradually moves from the predetermined text reference position in the predetermined text reference direction.

2. The display device according to claim 1, wherein the acquired text enlargement/contraction ratio is constant without respect to the measured distance.

3. The display device according to claim 1, wherein the graphic enlargement/contraction ratio is proportional to the measured distance in a range between its predetermined lower and upper limits thereof.

4. A display method comprising:

a displaying step of enlarging/contracting, when images and enlargement/contraction ratios are provided in a plurality of pairs, the images at the enlargement/contraction ratios and displaying the images on a display screen;

a measuring step of measuring a distance between the display screen and a user looking at images displayed on the display screen;

an enlargement/contraction ratio acquiring step of acquiring text and graphic enlargement/contraction ratios determined based on the measured distance;

a text-containing image generating step of generating a text-containing image with a predetermined size which represents a string to be presented to the user;

a graphic image generating step of generating a graphic image with a predetermined size which represents a graphic to be presented to the user; and a control step of controlling the displaying step by passing a pair of the generated graphic image and the acquired graphic enlargement/contraction ratio to the displaying step and by passing a pair of the generated text-containing image and the acquired text enlargement/contraction ratio to the displaying step, wherein:

as the measured distance increases, the graphic enlargement/contraction ratio is set to increase;

when the measured distance changes, a rate of change in the text enlargement/contraction ratio is set to be smaller than a rate of change in the graphic enlargement/contraction ratio;

in the displaying step, when display positions of the images are also given, the images at the display positions on the display screen are enlarged/contracted;

in the control step, a display position of the graphic image and a display position of the text-containing image on the display screen to the displaying step, such that a display region of the graphic image and a display region of the text-containing image are entirely within bounds of the display screen and such that as the measured distance decreases, and area of overlap decreases between the display region of the graphic image and the display region of the text-containing image on the display screen;

in the control step, a predetermined graphic reference position, a predetermined graphic reference direction, a predetermined text reference position, and a predetermined text reference direction are set on the display screen, such that the predetermined graphic reference direction and the predetermined text reference direction form a blunt angle; and in the control step, a display position of the graphic image and a display position of the text-containing image on the display screen to the displaying step such that as the measured distance decreases, the display position of the graphic image gradually moves from the predetermined graphic reference position in the predetermined graphic reference direction and the display position of the text-containing image gradually moves from the predetermined text reference position in the predetermined text reference direction.

5. A computer-readable information recording medium recording a program, the program causing a computer to act as:

a displaying unit which enlarges/contracts, when images and enlargement/contraction ratios are provided in a plurality of pairs, the images at the enlargement/contraction ratios and displays the images on a display screen;

a measuring unit which measures a distance between the display screen and a user looking at images displayed on the display screen;

an enlargement/contraction ratio acquiring unit which acquires text and graphic enlargement/contraction ratios determined based on the measured distance;

a text-containing image generating unit which generates a text-containing image with a predetermined size which represents a string to be presented to the user;

a graphic image generating unit which generates a graphic image with a predetermined size which represents a graphic to be presented to the user; and a control unit which controls the displaying unit by giving a pair of the generated graphic image and the acquired graphic enlargement/contraction ratio to the displaying unit and by giving a pair of the generated text-containing image and the acquired text enlargement/contraction ratio to the displaying unit, wherein:

as the measured distance increases, the graphic enlargement/contraction ratio is set to increase;

when the measured distance changes, a rate of change in the text enlargement/contraction ratio is set to be smaller than a rate of change in the graphic enlargement/contraction ratio;

the displaying unit, when display positions of the images are also given, enlarges/contracts the images at the display positions on the display screen;

the control unit controls the displaying unit by giving a display position of the graphic image and a display position of the text-containing image on the display screen to the displaying unit, such that a display region of the graphic image and a display region of the text-containing image are entirely within bounds of the display screen and such that as the measured distance decreases, and area of overlap decreases between the display region of the graphic image and the display region of the text-containing image on the display screen;

the control unit sets on the display screen a predetermined graphic reference position, a predetermined graphic reference direction, a predetermined text reference position, and a predetermined text reference direction such that the predetermined graphic reference direction and the predetermined text reference direction form a blunt angle; and the control unit controls the displaying unit by giving a display position of the graphic image and a display position of the text-containing image on the display screen to the displaying unit such that as the measured distance decreases, the display position of the graphic image gradually moves from the predetermined graphic reference position in the predetermined graphic reference direction and the display position of the text-containing image gradually moves from the predetermined text reference position in the predetermined text reference direction.

* * * * *